(12) United States Patent
Keefe (10) Patent No.: US 11,842,034 B2
(45) Date of Patent: Dec. 12, 2023

(54) SYSTEM AND METHOD FOR IMPLEMENTING AN INTERACTIVE ROADMAP PORTAL

(71) Applicant: JPMorgan Chase Bank, N.A., New York, NY (US)

(72) Inventor: Donna C. Keefe, Denver, CO (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 661 days.

(21) Appl. No.: 16/170,702

(22) Filed: Oct. 25, 2018

(65) Prior Publication Data

US 2019/0121508 A1 Apr. 25, 2019

Related U.S. Application Data

(60) Provisional application No. 62/576,808, filed on Oct. 25, 2017.

(51) Int. Cl.
*G06F 3/04847* (2022.01)
*G06F 3/0484* (2022.01)
(Continued)

(52) U.S. Cl.
CPC .......... *G06F 3/0484* (2013.01); *G06F 3/0482* (2013.01); *G06F 3/04817* (2013.01);
(Continued)

(58) Field of Classification Search
CPC ................. G06F 16/437; G06F 16/957; G06F 2221/0704; G06F 16/9535; G06F 16/178; G06F 11/1464; G06F 16/951; G06F 3/0482; G06F 16/24578; G06F 16/248; G06F 16/90328; G06F 16/954; G06F 3/04842; G06F 3/04817; G06F 16/9038; G06F 16/904; G06F 3/04847; G06F 15/173; G06F 15/177; G06F 9/5055; G06F 9/5083; G06F 16/635; G06F 3/0484; H04W 4/18;
(Continued)

(56) References Cited

U.S. PATENT DOCUMENTS

7,853,463 B2 * 12/2010 Orifici .................... G06Q 10/00
705/7.17
8,150,798 B2 * 4/2012 Ma ....................... G06Q 50/184
705/310
(Continued)

*Primary Examiner* — Dino Kujundzic
(74) *Attorney, Agent, or Firm* — GREENBLUM & BERNSTEIN, P.L.C.

(57) ABSTRACT

The invention relates to a dynamic interactive roadmap portal. An embodiment of the present invention is directed to a comprehensive one-stop interactive portal that provides events at a glance by dynamic views (e.g., line of business, region, month, etc.). The innovative system provides rich content including event status, event owners as well as data relating to services, products, engineering and/or other technical information. Real time updates may include certification workflows by and between product/service owners and end user advocates. For example, a user may apply an action to an event such as, share, add to calendar (reminder), follow or subscribe to it to be alerted of any changes. The innovative portal connects interested parties to supplementary documents and other information through easy-to-use linkages.

20 Claims, 10 Drawing Sheets

(51) Int. Cl.
  *G06Q 10/0637* (2023.01)
  *G06F 3/0482* (2013.01)
  *G06F 3/04817* (2022.01)
  *G06Q 10/0631* (2023.01)

(52) U.S. Cl.
  CPC ..... *G06F 3/04847* (2013.01); *G06Q 10/0637* (2013.01); *G06Q 10/063114* (2013.01)

(58) Field of Classification Search
  CPC .... H04W 4/025; H04L 41/0823; H04L 43/10; H04L 67/16; H04L 41/5041; H04L 67/2885; H04L 67/2814; G06Q 10/063114
  See application file for complete search history.

(56) References Cited

U.S. PATENT DOCUMENTS

| | | | | |
|---|---|---|---|---|
| 8,463,660 | B1* | 6/2013 | White | G06Q 30/08 705/26.1 |
| 9,032,308 | B2* | 5/2015 | Chen | G06Q 30/02 715/705 |
| 9,240,002 | B2* | 1/2016 | Hume | G06Q 10/10 |
| 9,582,777 | B2* | 2/2017 | Zimmerman | G06Q 10/06 |
| 9,600,659 | B1* | 3/2017 | Bird | G06F 21/50 |
| 10,120,552 | B2* | 11/2018 | King | G06F 3/04847 |
| 10,127,507 | B2* | 11/2018 | Lavrov | G06Q 10/06313 |
| 2002/0007330 | A1* | 1/2002 | Kumar | G06F 16/9535 705/36 R |
| 2002/0123955 | A1* | 9/2002 | Andreski | G06Q 30/02 705/37 |
| 2003/0074391 | A1* | 4/2003 | Carter | G06Q 30/0201 709/200 |
| 2004/0006478 | A1* | 1/2004 | Alpdemir | G06Q 30/02 704/275 |
| 2004/0006566 | A1* | 1/2004 | Taylor | G06Q 10/10 |
| 2004/0030992 | A1* | 2/2004 | Moisa | G06Q 10/10 715/234 |
| 2004/0119713 | A1* | 6/2004 | Meyringer | G06Q 10/06 345/440 |
| 2004/0249658 | A1* | 12/2004 | Schwerin-Wenzel | G06Q 10/067 705/36 R |
| 2005/0015333 | A1* | 1/2005 | Schwerin-Wenzel | G06Q 10/10 705/39 |
| 2006/0122861 | A1* | 6/2006 | Scott | G06Q 10/00 705/7.19 |
| 2007/0027909 | A1* | 2/2007 | Moore | G06Q 10/10 |
| 2007/0028175 | A1* | 2/2007 | Moore | G06F 9/5072 715/733 |
| 2007/0192155 | A1* | 8/2007 | Gauger | G06Q 10/00 705/301 |
| 2008/0120129 | A1* | 5/2008 | Seubert | G06Q 10/06 705/35 |
| 2009/0016507 | A1* | 1/2009 | Altberg | G06Q 30/02 379/114.01 |
| 2009/0019375 | A1* | 1/2009 | Garofalo | A63F 13/213 715/753 |
| 2009/0249446 | A1* | 10/2009 | Jenkins | G06F 16/93 726/3 |
| 2010/0005008 | A1* | 1/2010 | Duncker | G06F 16/972 705/26.1 |
| 2010/0005411 | A1* | 1/2010 | Duncker | G06F 3/0482 715/769 |
| 2010/0174656 | A1* | 7/2010 | Nolan | G06Q 10/06 705/301 |
| 2010/0205549 | A1* | 8/2010 | Chen | G06Q 10/10 715/760 |
| 2012/0004947 | A1* | 1/2012 | Dombrowski | G06F 3/04847 705/7.29 |
| 2012/0278388 | A1* | 11/2012 | Kleinbart | G06Q 10/06 709/204 |
| 2013/0198180 | A1* | 8/2013 | Channing | G06F 16/901 707/736 |
| 2013/0304616 | A1* | 11/2013 | Raleigh | G06Q 20/145 705/34 |
| 2014/0047560 | A1* | 2/2014 | Meyer | G06F 21/10 726/28 |
| 2014/0075390 | A1* | 3/2014 | Gauthier | G06Q 10/0631 715/810 |
| 2014/0081690 | A1* | 3/2014 | Winters | G06Q 10/063114 705/7.15 |
| 2014/0129457 | A1* | 5/2014 | Peeler | G06Q 10/067 705/317 |
| 2014/0156315 | A1* | 6/2014 | Canovi | G06Q 40/08 705/4 |
| 2014/0173660 | A1* | 6/2014 | Correa | H04L 65/602 725/42 |
| 2015/0379448 | A1* | 12/2015 | Santos | G06Q 10/06313 705/7.23 |
| 2016/0026960 | A1* | 1/2016 | Carnahan | G06Q 10/06393 705/7.39 |
| 2016/0322021 | A1* | 11/2016 | Duncker | G06F 3/14 |
| 2017/0041296 | A1* | 2/2017 | Ford | G06F 16/951 |
| 2017/0076009 | A1* | 3/2017 | Kleinbart | G06F 16/904 |
| 2017/0083585 | A1* | 3/2017 | Chen | G06F 11/323 |
| 2017/0085446 | A1* | 3/2017 | Zhong | H04L 41/12 |
| 2017/0286455 | A1* | 10/2017 | Li | G06F 16/24575 |
| 2018/0121881 | A1* | 5/2018 | Kumar | G06F 40/186 |
| 2018/0189873 | A1* | 7/2018 | Annett | G06Q 40/04 |
| 2018/0358123 | A1* | 12/2018 | Silver | G16H 40/20 |
| 2019/0104325 | A1* | 4/2019 | Linares | H04N 21/236 |
| 2019/0214125 | A1* | 7/2019 | Zeller | G16H 10/20 |

\* cited by examiner

SYSTEM AND METHOD FOR IMPLEMENTING AN INTERACTIVE ROADMAP PORTAL

CROSS REFERENCE TO RELATED APPLICATIONS

This application claims priority to U.S. Provisional Application 62/576,808, filed Oct. 25, 2017, the contents of which are incorporated herein in its entirety.

FIELD OF THE INVENTION

The invention relates generally to a system and method for implementing an interactive roadmap portal.

BACKGROUND OF THE INVENTION

Current systems suffer from a lack of transparency of end user impacting events for business units; such as, new product releases, service enhancements, migrations, and decommissions. With traditional solutions, the ability to see events across various metrics required many manual hours that could not be sustained. Event updates could only be done once a month, at best, and information may be outdated by the time the business units receive the information.

These and other drawbacks exist.

SUMMARY OF THE INVENTION

According to one embodiment, the invention relates to a system that implements an Interactive Roadmap Portal. The system provides a dynamic interactive roadmap portal and comprises: a central data repository that stores and maintains event data captured at least in part by an Intake Tracker; a user interface that receives an input via a network communication; and a processor, coupled to the central data repository and the user interface, configured to perform the steps comprising: receiving, via an electronic input, real-time event data; generating, via a plurality of applications, an event icon that represents event status and event details; and graphically displaying, via an Interactive Roadmap Portal, the event icon relative to a plurality of other events across a time period; the interactive user interface comprises a business collaboration section, a real-time communication section and a workspace services section, wherein the event icon displays a separate event details interface.

According to an embodiment of the present invention, a method provides a dynamic interactive roadmap portal. The method comprises the steps of: storing event data captured at least in part by an Intake Tracker; receiving, via an electronic input, real-time event data; generating, via a plurality of applications, an event icon that represents event status and event details; and graphically displaying, via an Interactive Roadmap Portal, the event icon relative to a plurality of other events across a time period; the interactive user interface comprises a business collaboration section, a real-time communication section and a workspace services section, wherein the event icon displays a separate event details interface.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. The innovative system is directed to an interactive roadmap tool that provides events at a glance by dynamic views (e.g., line of business, region, month, etc.). The interactive roadmap tool provides a significant improvement over conventional manual labor intensive systems. The various embodiments of the present invention may achieve benefits including richer content; real-time delivery; self-service channel; ease of dissemination; custom and audience-specific views; source for EPN (Extended Partner Network) newsletter; transparency inter/intra EUS (End User Services); and partnership inter/intra GTI (Global Technology Infrastructure). These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a comprehensive one-stop interactive portal that provides events at a glance by dynamic views (e.g., line of business, region, month, etc.). The innovative system provides rich content including event status, event owner(s) as well as data relating to services, products, engineering and/or other technical information. Real time updates may include certification workflows by and between product/service owners and end user advocates. For example, a user may apply an action to an event such as, share, add to calendar (reminder), follow or subscribe to be alerted of any changes and/or updates. The innovative portal connects interested parties to supplementary documents and other information through easy-to-use linkages. Views selected by users may be exported to commonly used formats for sharing and efficiency (e.g., spreadsheet, table, PDF, etc.). An embodiment of the present invention provides visibility into support work streams and milestones towards successful product launches; e.g., research, quality assurance, testing, marketing, communications, client engagement, etc.

The various embodiments of the present invention may be applied to any firm or business unit that needs to display product development roadmap items in an interactive and dynamic manner. An embodiment of the present invention may be expanded to include development task details for end-to-end project management.

Management of resource demand, including availability or constraints may be accommodated through a set of converged tools including an IRP (Interactive Roadmap Portal), BOW (Book of Work) and Intake Tracker (Forum/Board Intake Tracker). Included in this set of tools is the management of content that may be displayed through the supplemental links available for each event. The content may be managed centrally and certified regularly to ensure relevance and accuracy of information.

According to an embodiment of the present invention, the innovative roadmap provides visibility into user-impacting releases/events and facilitates opportunities to coordinate more effectively. For each roadmap event, a corresponding BOW (Book of Work) entry may be created to align and commit resources to these activities with disciplines that result in improved user experience. The BOW entry may track these disciplines by capturing commitments made by Functional Area team members and their respective management (e.g., Research, QA/Testing, Marketing, Communication, Client Engagement) with the duration of the commitment (e.g., stop/end dates), the manner or form of support (e.g., channel, artifact, cadence), and resource allocation percentage. Accordingly, requests, inquiries and/or event submissions may run through an Intake Tracker (e.g., Forum/Board Intake Tracker) to ensure that products and/or services related interactions with stakeholders are captured and dispositioned.

According to an embodiment of present invention, an initiation process may involve uploading captured roadmap items and augmenting with additional information not previously formalized, e.g., milestones. New items may be entered via an input form interface. Items may undergo an inaugural certification.

According to an embodiment of the present invention, a production process may involve a service/group owner receiving an alert to certify based on an agreed-upon cadence. Updates submitted by service/group owners may be staged pending final review and approval by User Experience and Account (UXAM) or Employee Technology Experience (ETE) administrator. In this example, approved updates/entries may be published. Book of Work may be updated accordingly and appropriate alerts to impacted parties (e.g., UXAM, ETE, EUS, Extended Partner Network, etc.) may be sent.

Figure 1:
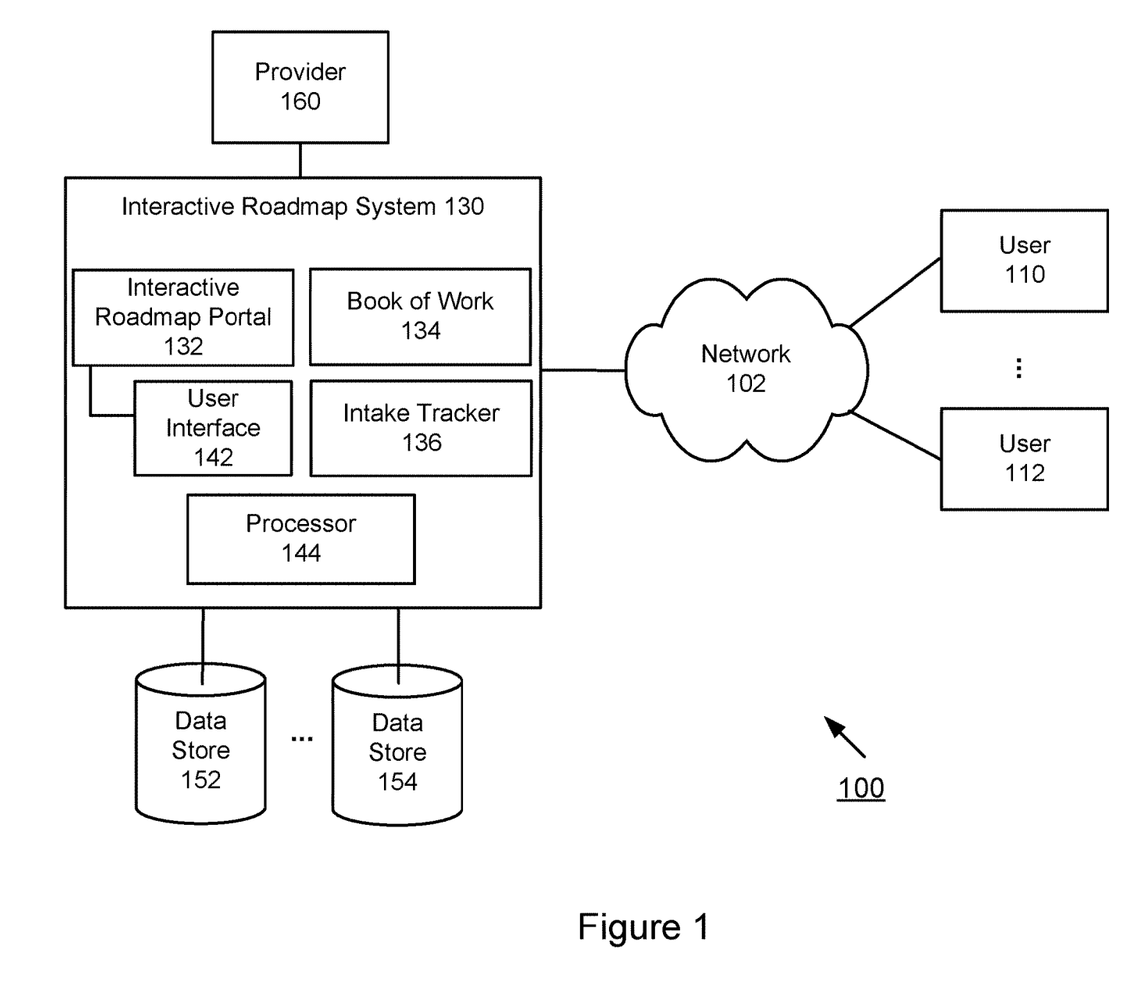
FIG. 1 illustrates a schematic diagram of a system that implements an Interactive Roadmap System, according to an exemplary embodiment.

FIG. 1 illustrates a schematic diagram of a system that implements an Interactive Roadmap System, according to an exemplary embodiment. As illustrated in FIG. 1, Network 102 may be communicatively coupled with one or more data devices including, for example, computing devices associated with end users, represented by User 110, 112. Users may represent business representatives, project managers, administrators, engineering leads, service leads, etc. Computing devices may include computers, laptops, workstations, kiosks, terminals, tablets, mobile devices, mobile phones, smart devices, etc. Network 102 communicates with Interactive Roadmap System 130 that performs management of and provides visibility into real-time event data. Interactive Roadmap System 130 may include an Interactive Roadmap Portal 132, Book of Work 134, Intake Tracker 136 and Processor 144, in accordance with the various embodiments of the present invention. For example, Interactive Roadmap Portal 132 may promotes transparency and collaboration by and between service providers and consumers via User Interface 142. Book of Work 134 may identify treatments and disciplines to help ensure optimal user experience. For example, a product release may require support from these disciplines or Functional Areas: Research (in the form of a usability testing), Marketing (in the form of a product guide), and Communication (in the form of a targeted email to select users). Book of Work may also provide resource planning, alignment and accountability. Bool of Work may represent a collection of projects, events and other tasks a team is working on. Intake Tracker 136 may provide forums and boards to foster exchange of ideas and insights and further capture and track information, e.g., enhancements, gaps, etc.

Interactive Roadmap System 130 may also incorporate modules and other functions. These modules are exemplary and illustrative, Interactive Roadmap Portal 132 may interact with additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

Interactive Roadmap System 130 may be communicatively coupled to data storage devices represented by Data stores 152, 154 as well as remote storages. Also, Data stores 152, 154 may also store and maintain event data, Book of Work data, intake data, user preferences, historical data, trend data, etc. The interactive roadmap features described herein may be provided by Interactive Roadmap System 130 and/or a third party provider, represented by 160, where Provider 160 may operate with Interactive Roadmap System 130.

Storage components may include any suitable data structure to maintain the information and allow access and retrieval of the information. For example, the storage components may keep the data in an organized fashion and may be any type of database as may be known in the art to store and organize data as described herein. The storage may be local, remote, or a combination. The storage components may have back-up capability built-in. Communications with the storage components may be over a network, such as Network 102, or communications may involve a direct connection between the various storage components and Interactive Roadmap System 130, as depicted in FIG. 1. The storage components may also represent cloud or other network based storage.

The system 100 of FIG. 1 may be implemented in a variety of ways. Architecture within system 100 may be implemented as hardware components (e.g., module) within one or more network elements. It should also be appreciated that architecture within system 100 may be implemented in computer executable software (e.g., on a tangible, non-transitory computer-readable medium) located within one or more network elements. Module functionality of architecture within system 100 may be located on a single device or distributed across a plurality of devices including one or more centralized servers and one or more mobile units or end user devices. The architecture depicted in system 100 is meant to be exemplary and non-limiting. For example, while connections and relationships between the elements of system 100 is depicted, it should be appreciated that other connections and relationships are possible. The system 100 described below may be used to implement the various methods herein, by way of example. Various elements of the system 100 may be referenced in explaining the exemplary methods described herein.

Network 102 may be a wireless network, a wired network or any combination of wireless network and wired network. Network 102 may support an Internet network, a wireless communication network, a cellular network, Bluetooth, or the like, or any combination thereof. Although Network 102 is depicted as one network for simplicity, it should be appreciated that according to one or more embodiments, Network 102 may comprise a plurality of interconnected networks, such as, for example, a service provider network, the Internet, a cellular network, corporate networks, or even home networks, or any of the types of networks mentioned above. Data may be transmitted and received via Network 102 utilizing a standard networking protocol or a standard telecommunications protocol.

While FIG. 1 illustrates individual devices or components, it should be appreciated that there may be several of such devices to carry out the various exemplary embodiments. Interactive Roadmap System 130 may communicate using any mobile or computing device, such as a laptop computer, a personal digital assistant, a smartphone, a smartwatch, smart glasses, other wearables or other computing devices capable of sending or receiving network signals. Customer devices may have an application installed that is associated with Interactive Roadmap System 130.

An embodiment of the present invention may be applied to various applications, including software development (e.g., agile methodology, sprint planning, etc.), product enhancement, software enhancement, new release, data migration, etc. For example, the Interactive Roadmap System enables developers to communicate rapidly to the user community in a manner that facilitates transparency and collaboration. Other applications may include marketing where various types of marketing campaigns (e.g., digital screen, print, email, text, in-person, etc.) may be effectively managed.

Figure 2:
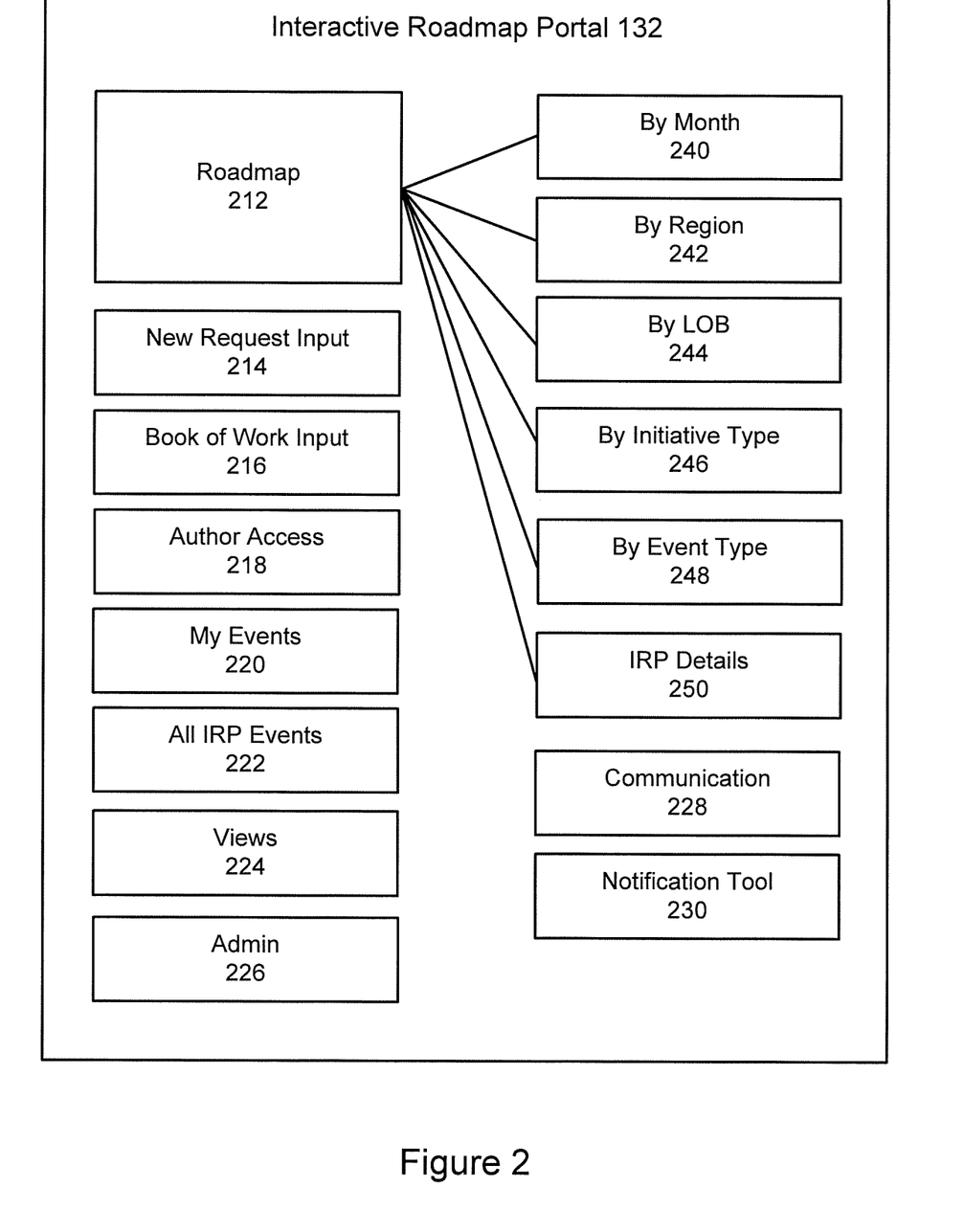
FIG. 2 illustrates an exemplary interactive interface of an Interactive Roadmap Portal, according to an embodiment of the present invention.

FIG. 2 illustrates an exemplary interactive interface of an Interactive Roadmap Portal, according to an embodiment of the present invention. An interactive interface, as represented by Interactive Roadmap Portal 132, of an embodiment of the present invention, may provide various displays and interactive functions. For example, Interactive Roadmap Portal 132 may provide a plurality of sections and subsections including Roadmap 212, New Request 214 Input, Book of Work 216 Input, Author Access 218, My Events 220, All IRP Events 222, Views 224 and Admin 226.

Roadmap 212 may include additional features, including the ability to view By Month 240, By Region 242, By Line of Business (LOB) 244, By Initiative Type 246, By Event Type 248 and IRP Details 250. A Month view, represented by 240, may display events via a timeline. In addition, the events may be adjusted for display on other time intervals (e.g., day view, week view, bi-monthly, quarterly, yearly, etc.). The events may also be displayed via other custom intervals, e.g., based on predetermined time periods. This may include production, pre-launch, launch, post-launch, etc. Other variations may be applied. A Region view, represented by 242, may display events based on geographic region. This may include countries, regions (e.g., APAC, Europe), states, cities, counties, etc. User defined geographic regions may also be defined and applied. A LOB view, represented by 244, may provide events based on a company's lines of business. In the example of a financial institution, this may include checking, savings, investment, mortgages, commercial banking, etc.

New Request Input 214 may represent an event intake interface. Event data may include event name, source of request, event type, brief description, region, initiative type, reason for event, line of business, project status and/or funding approved. For example, New Request Input 214 may serve as an interface to Intake Tracker 136.

An embodiment of the present invention provides an event/intake interface for a streamlined submission and approval process as well as automatic creation of tasks associated with each IRP/BOW event for new submissions. New Request may also capture Assistive Technology.

Creating a New Event link may serve various roles including (i) submission of IRP events as previously available; and, (ii) capturing of inquiries or feedback received from LOB/Regional Engagement Forums and the like.

Book of Work Input 216 may represent a collection of current projects, tasks and/or other events. Data may include event name, source of request, event type, brief description, region, initiative type, reason for event, line of business, project status, etc. For example, Book of Work Input 216 may serve as an interface to Book of Work 134.

Author Access 218 may enable a user to request access to events. This may include making edits and/or other updates and changes; such as, new product features that enhance user experience, dependencies that impact the target release date of the new product features, or a revised target release date.

My Events 220 may enable a user to view events that are specific to a user, or a user's team.

All IRP Events 222 enables a user to view all current events, regardless of ownership or involvement.

Views 224 may enable a user to view a full set of events as well as events via a time period, such as a 30 day view, 60 day view and/or 90 day view. Other variations may be applied. Event data may include ID, event name, service approval status, UXAM or ETE approval status, service family, service, initiative type, event type, available or start date, end date, other end date, brief description, reason for event, project status, funding approved, key benefits, etc.

Admin 226 may provide administrative functions to an authorized user. Various permissions, entitlements and/or other privileges may be defined and managed.

Other features may include Communication 228 and Notification Tool 230. An embodiment of the present invention may apply categories based on planned status and/or level of urgency. For example, categories may include low urgency, moderate urgency and high urgency. Other variations and levels of granularity may be applied. Low urgency events may be due to change in planned event or deployment. This may involve messaging to occur within a predetermined number of business days. Moderate urgency events may be due to unplanned impact to end users. This may involve messaging to occur within a shorter time period, e.g., 48 hours. High urgency events may be due to risk regulatory and/or security concerns. This may involve a more immediate message, e.g., 24 hours. A news feed may display new events entered into the IRP since a last view date, other time period or event. In addition, a 30, 60, 90 day view for events releasing or starting within a specified time period may be provided. Communication may be performed by various methods, including email, text message, voice message, news feed, etc.

Notification Tool 230 may provide an alert feature that enables a user to subscribe and/or follow an event. For example, Interactive Roadmap Portal 132 may include a built-in notification component that enables users to "subscribe" to event-based alerts to notify them of any changes to a given event (e.g., change in features, change in dates or rollout schedule, change in dependencies, etc.). In addition, Interactive Roadmap Portal 132 may also be set up by the user to set up global alerts rather than event-specific; e.g., new events in the last 7 days, etc. Interactive Roadmap Portal 132 may use other notification mechanism, such as email, text, voice service and/or a core notification tool. For example, core notification tool may represent a global messaging system used for quick alerts for quick actions and/or awareness. Core notification tool may further prioritize messages for display to a targeted recipient or group of recipients.

Figure 5:
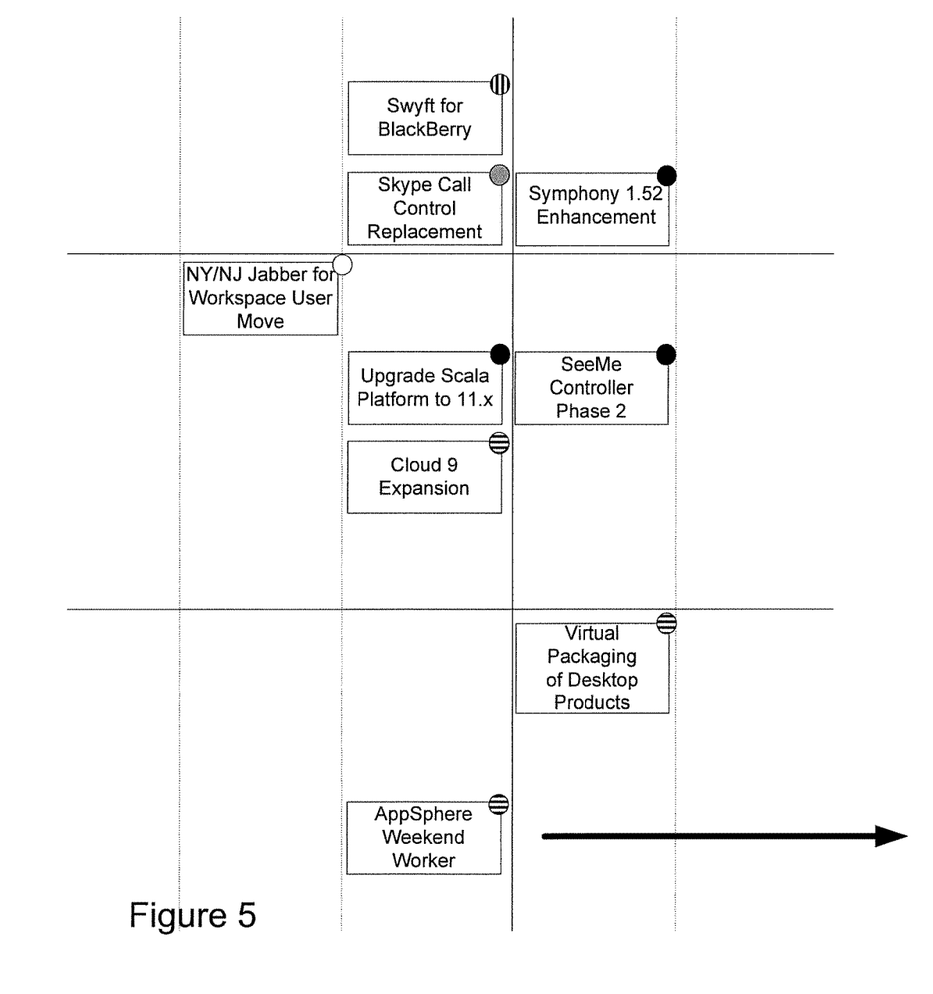
FIG. 5 is a detailed view of events, according to an embodiment of the present invention.

An embodiment of the present invention provides multiple ways to self-subscribe to alerts. For example, a user may subscribe to RSS Feeds (customizable for user preference); Event Detail Pop-Up (Alerts); Alerts List, etc. A user may set an alert for a specific event by interacting with an Event from the Roadmap, as shown in FIG. 5. Users may also manage alerts.

Figure 3:
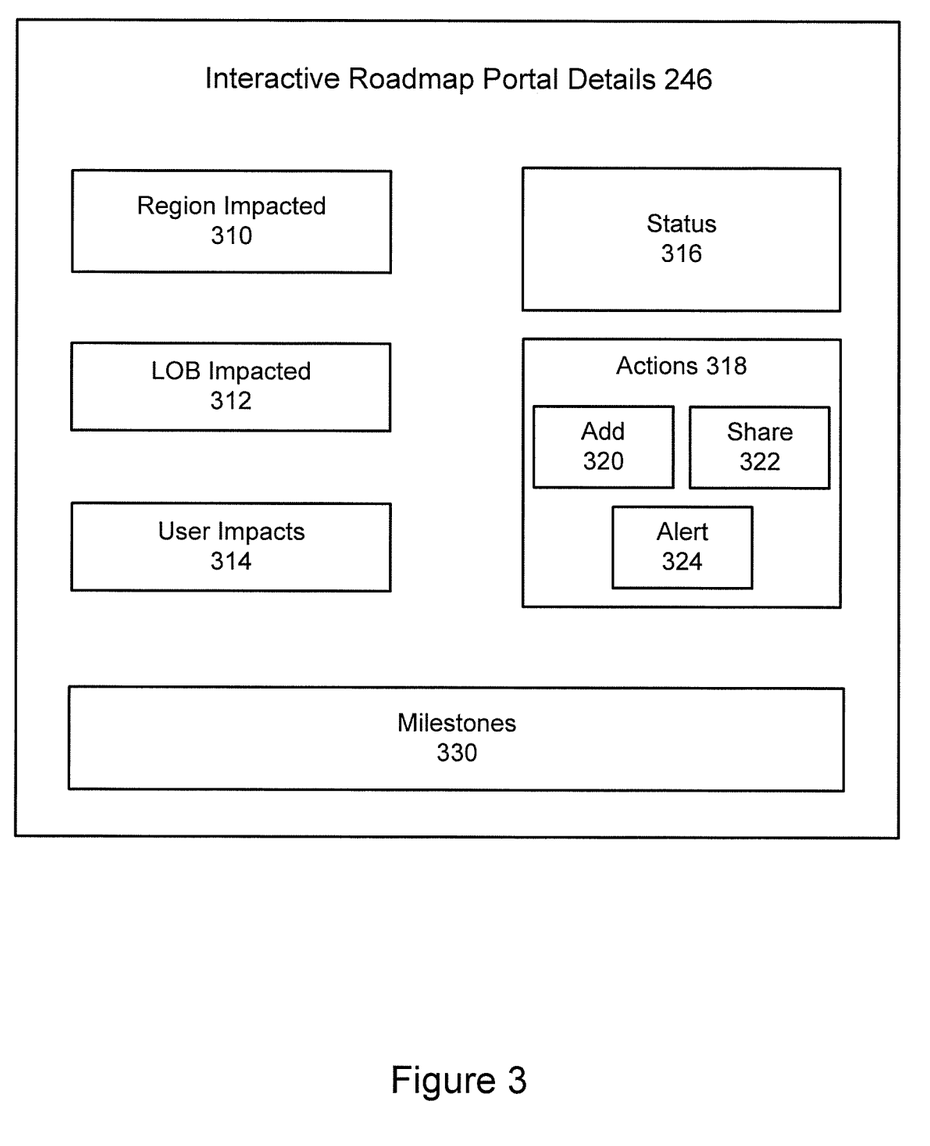
FIG. 3 illustrates an exemplary interactive interface of an Interactive Roadmap Portal Detail, according to an embodiment of the present invention.

FIG. 3 illustrates an exemplary interactive interface of an Interactive Roadmap Portal Detail, according to an embodiment of the present invention. Interactive Roadmap Portal Detail may include various modules and interactive sections. Additional details concerning the event may be provided, such as reason for the event, key benefits, etc. As shown in FIG. 3, impact data may be provided to the user for a specific event. Impacts may include Region Impacted 310, LOB Impacted 312, User Impacts 314 and/or other criteria. Status 316 may provide a graphical icon that indicates a current status of the event. Status 316 may also include supplemental resource links and contact links for responsible team members. Actions 318 including Add 320, Share 322 and Alert 324 as well as Milestones 330. Additional details are provided in connection with FIG. 6.

Users may also toggle between UXAM or ETE commitments to functional area in support or an event, and event milestones as they occur or impact end users.

Figure 4:
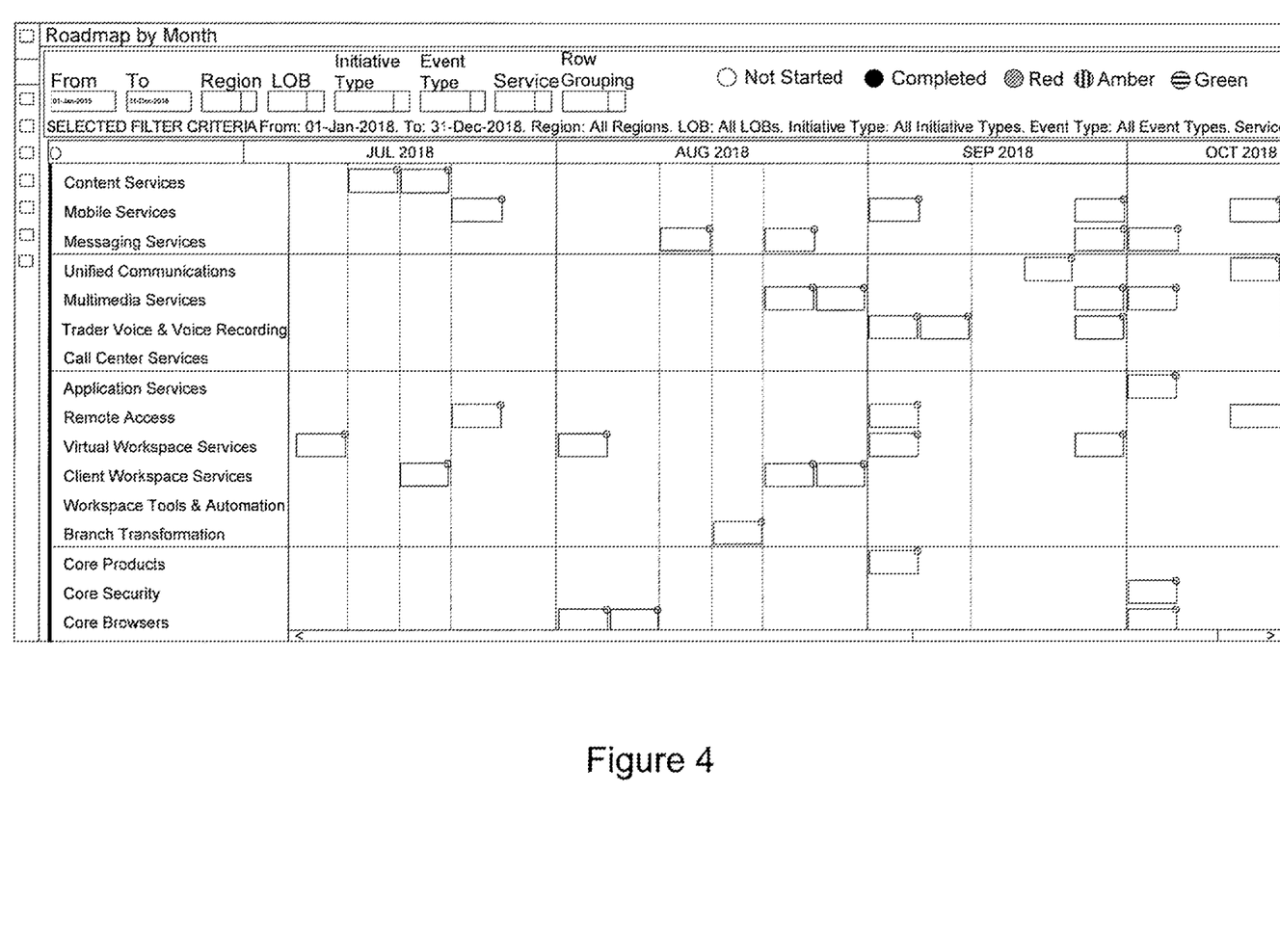
FIG. 4 is an exemplary interactive interface, according to an embodiment of the present invention.

FIG. 4 is an exemplary interactive interface, according to an embodiment of the present invention. FIG. 4 represents an exemplary view that displays events by month. Other time periods may be selected and viewed (e.g., by week, by year, by custom date range, etc.). Data provided may be filtered in various ways, including Time Frame (e.g., start, end), Region, Line of Business (LOB), Initiative Type (e.g., Customer-Facing, Architecturally Significant, etc.), Event Type, Service, Row Grouping and Dependencies (Funding Approval, Senior Management Approval, etc.). Other filters may be applied, including technology specific filters, for example.

FIG. 4 may display various categories or types of events. Events may include Business Collaboration, Real-Time Communications, Workspace Services, Security, Strategy and Architecture, User Experience and Account Management, Global Service Operations, Application Software Engineer, Test Service Sprint and UXAM or ETE Book of Work. For each event, a visual indicator may signal event status, including Not Started, Completed and color codes to indicate varying degrees of progress. For example, an embodiment of the present invention may include a Funding indicator. According to another embodiment of the present invention, a visual RAG status may be provided for quick status. Other visual indicators may be applied. Funding information is also be available in Event details and as search filter. A vertical today bar may be shown to provide the user a reference point.

Business Collaboration may include content services, mobile services, messaging services as well as email services, messaging services and file and print services. Real-Time Communications may include unified communications, multimedia services, trader voice and voice recording and call center services. Workspace Services may include application services, remote access, virtual workspace services, client workspace services, workspace tools and automation, and branch transformation. Security, Strategy and Architecture may include core analytics and monitoring as well as core products, core security and core browsers.

A user may interact with an event icon. FIG. 5 is a detailed view of a set of events, according to an embodiment of the present invention. Additional details may be provided, as illustrated by FIGS. 6-7.

Figure 6:
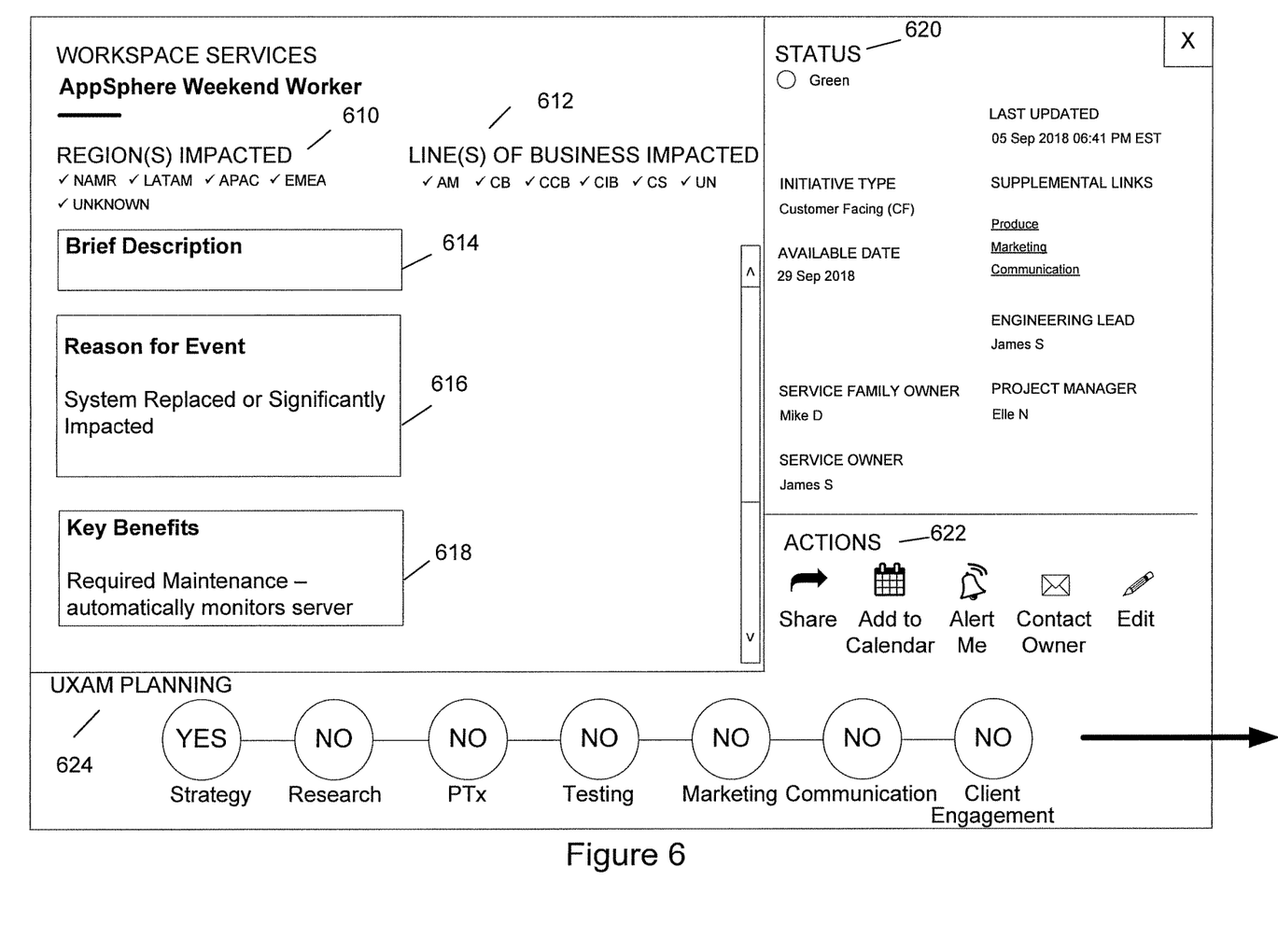
FIG. 6 represents an exemplary interactive interface, according to an embodiment of the present invention.
Figure 7:
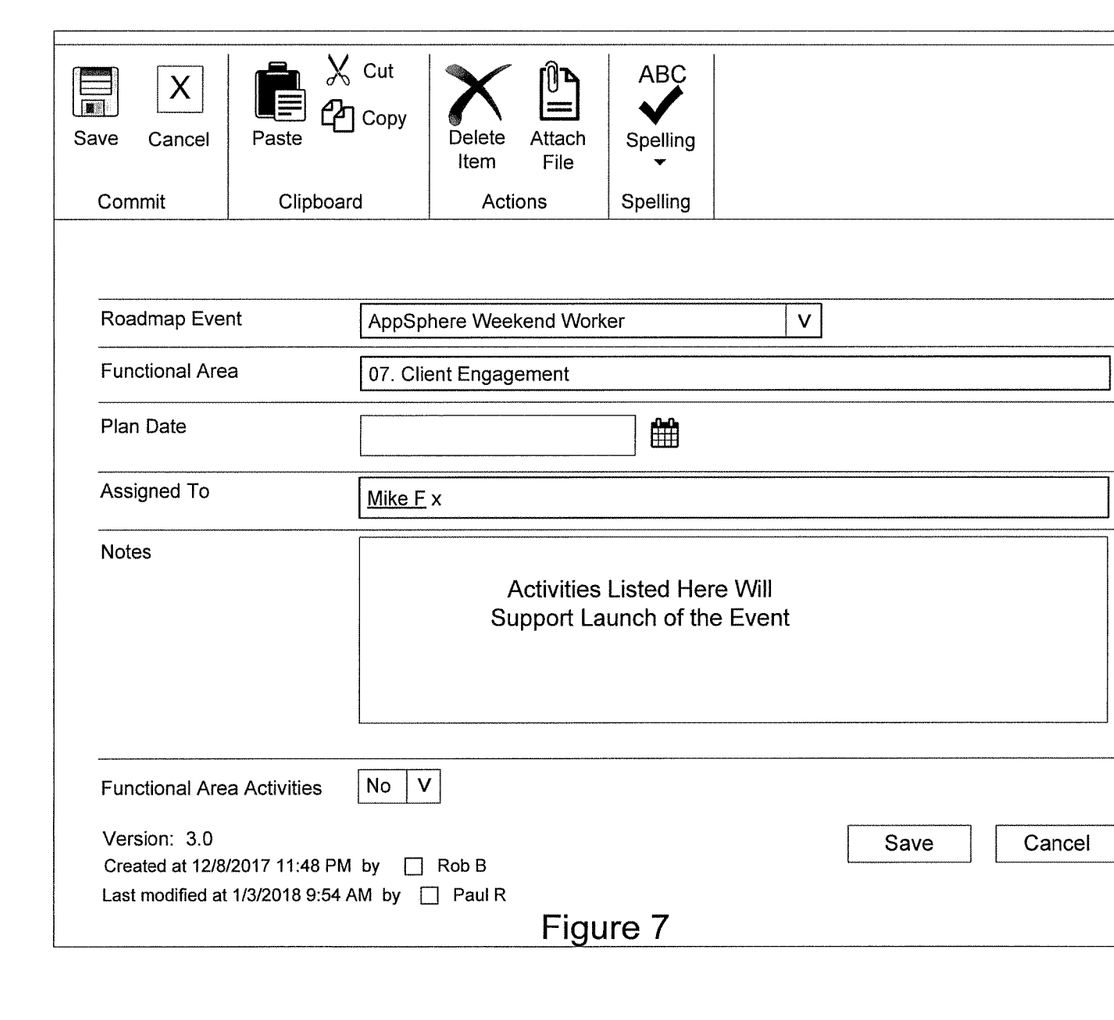
FIG. 7 represents an exemplary interactive interface, according to an embodiment of the present invention.

FIGS. 6-7 represent exemplary interactive interfaces, according to an embodiment of the present invention. In this example, FIG. 6 illustrates event details for a specific event, such as AppSphere Weekend Worker. In this exemplary interface, an exemplary event detail interface may illustrate impacts, such as Region(s) Impacted at 610 and Line(s) of Business Impacted at 612. Event Detail interface may also a brief description at 614, reason for event at 616 and key benefits at 618.

Status Panel 620 may provide various types of status information, including a color coded icon, initiative type, available date, service family owner, service owner, last updated, supplemental links (e.g., technical, marketing, and communication), engineering lead and project manager. For example, Status Panel 620 may include red, amber, green (RAG) graphic with additional details including path to green, target date, date type, funding status, last update. Actions 622 may include Share, Add to Calendar, Alert, Contact Owner and Edit. Another feature may include exported the data to another application as well as generating a PDF version.

A milestone graphic 624 may illustrate start, planning, usability testing, proof of concept (POC), pilot, quality assurance (QA), performance testing, branding creative, messaging and end. In this example, milestones may include Strategy, Research, PTx ('Permit To' tollgates, where 'x'=Plan, Build, Operate, Release, etc.), Testing, Marketing, Communication, Client Engagement, etc. Depending on the type of application, business and industry, the milestones may be updated. For events that are falling behind target dates, a statement may be included to explain the delay and/or the tasks that need to be completed in order for the event to meet its target date(s). Contact identification may be provided, which may include Service Tower owner, Service Group owner and Project Manager. Other individuals, teams and/or contact specific data may be provided.

UXAM or ETE Milestones may be viewed by clicking on an Event box on the IRP. As shown in FIG. 6; milestones may be located on a bottom section of the Event box. In addition, an embodiment of the present invention may allow a user, such as UXAM or ETE Functional Area Leads, to "opt-in" and commit resources to an IRP event. Commitments and event updates that have an effect on commitments may be reviewed weekly (or other basis) as part of the Book of Work planning sessions.

Some of the icons may include a funding symbol ("$") that represents whether funding has been approved or not. Other symbols and representations may be applied, such as overall project status.

Other views may include regional views, lines of business views. For example, regions may include geographic areas, e.g., NAMR (North America), APAC (Asia-Pacific), EMEA (Europe Middle East and Africa), LATAM (Latin America). For other applications and industries, regions may be defined differently. For example, an application may be concerned with the continental US regions, specific states, cities and/or other geographic units.

An embodiment of the present invention may provide information concerning certification (e.g., date validation, etc.) required from Service Tower/Group Owners based on agreed upon cadence. Also, certification cadence may represent confirmation targets based on projected end/live date.

FIG. 7 illustrates a detailed view of a Milestone event, according to an embodiment of the present invention. In this example, a user may select Client Engagement function. As shown in FIG. 7, a plan date may be assigned to this roadmap event. In addition, the event may be assigned to an owner, individual and/or team. Addition activities may be listed to support launch of the event. Specific activities by discipline or Functional Area may be listed to support launch of the event if the Functional Area has opted-in to the event; e.g., Research—focus group, survey, usability testing; Marketing—instructional video, digital signage; Communication—targeted email, intranet article; Testing—performance; etc. For each support activity listed, additional information, such as details about the planning and execution of the given activity, including date the activity is seen by the end user, may be provided.

The various embodiments of the present invention may be applied to other industries, including wedding planning businesses.

Figure 8:
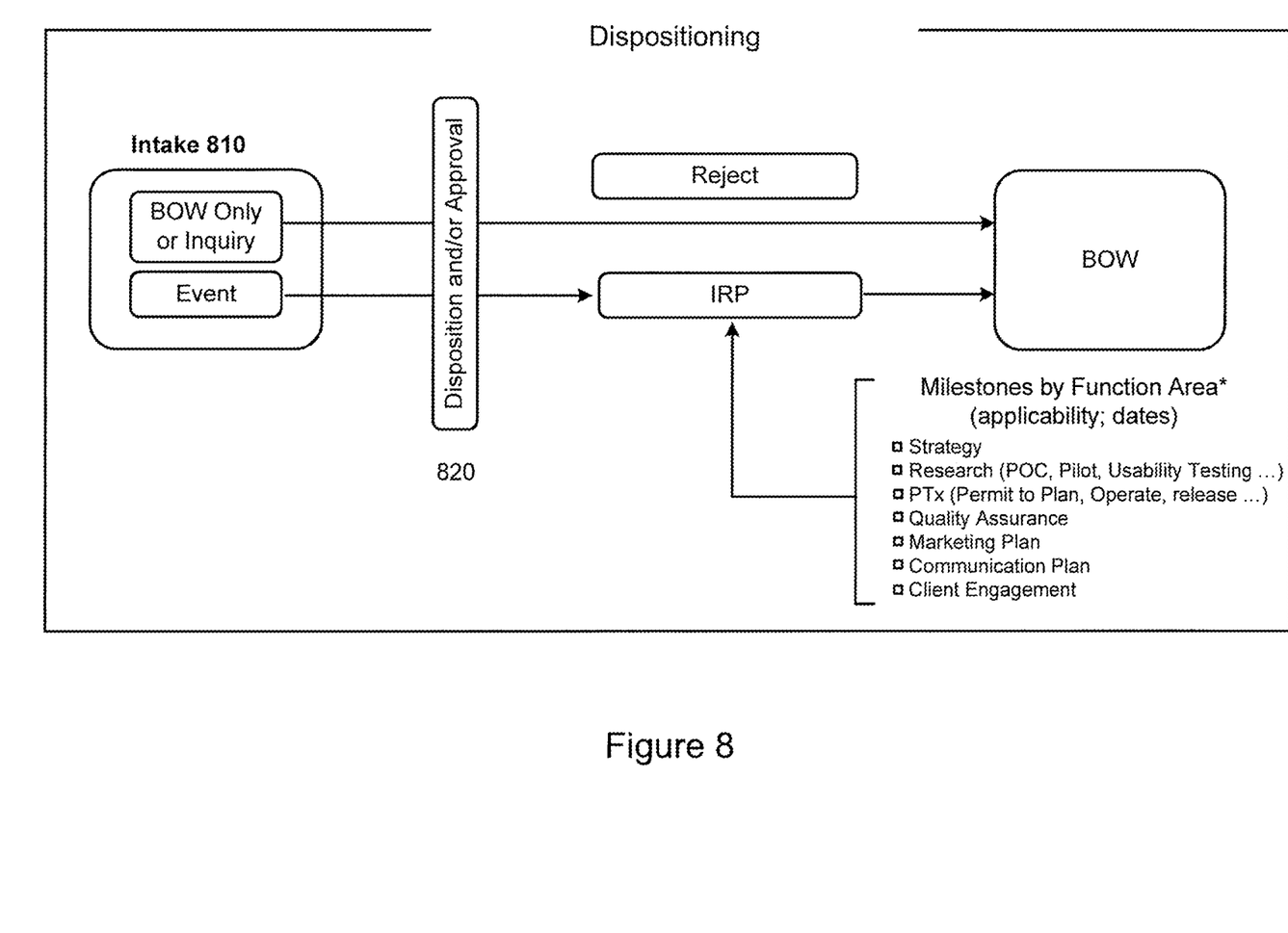
FIG. 8 is an exemplary diagram of an intake process, according to an embodiment of the present invention.

FIG. 8 is an exemplary diagram of an intake process, according to an embodiment of the present invention. The intake process shown in FIG. 8 illustrates a transparency in disposition. At Intake 810, inquiries and events may be received. At 820, disposition and/or approval may be applied. Disposition options may be visible to all and may include BOW and IRP, BOW only and inquiry. Disposition options may be visible to IRP administration only. This may include options, such as assign to product owner or ETE for research and/or evaluation; return to submitter or author requiring additional information and reject because funding, timing, not recommended, already exists in IRP, etc.

Figure 9:
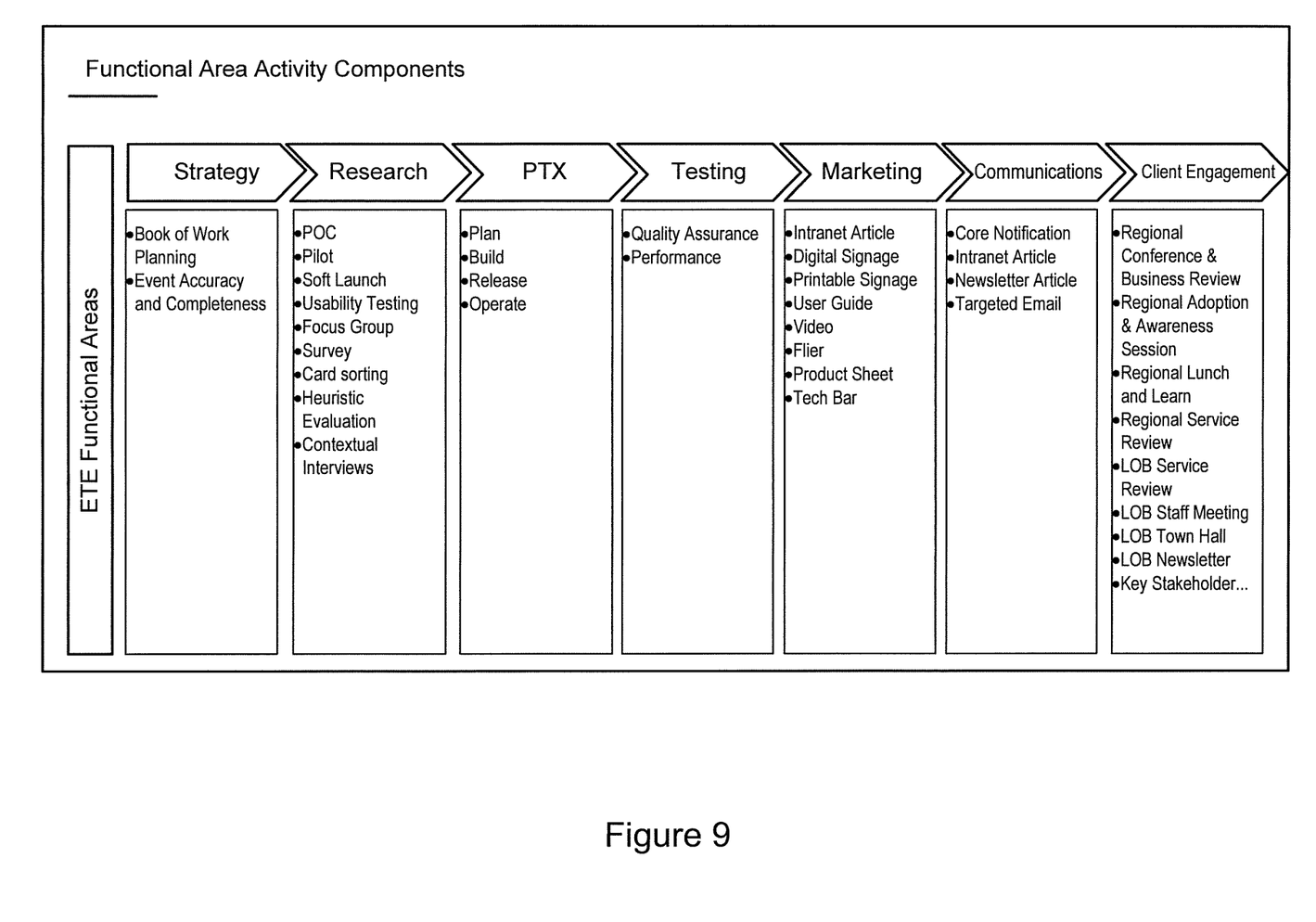
FIG. 9 is an exemplary illustration of functional area activity components, according to an embodiment of the present invention.

FIG. 9 is an exemplary illustration of functional area activity components, according to an embodiment of the present invention. FIG. 9 illustrates functional areas for strategy, research, PTx, testing, marketing, communications and client engagement. Other areas may be applied and implemented.

Figure 10:
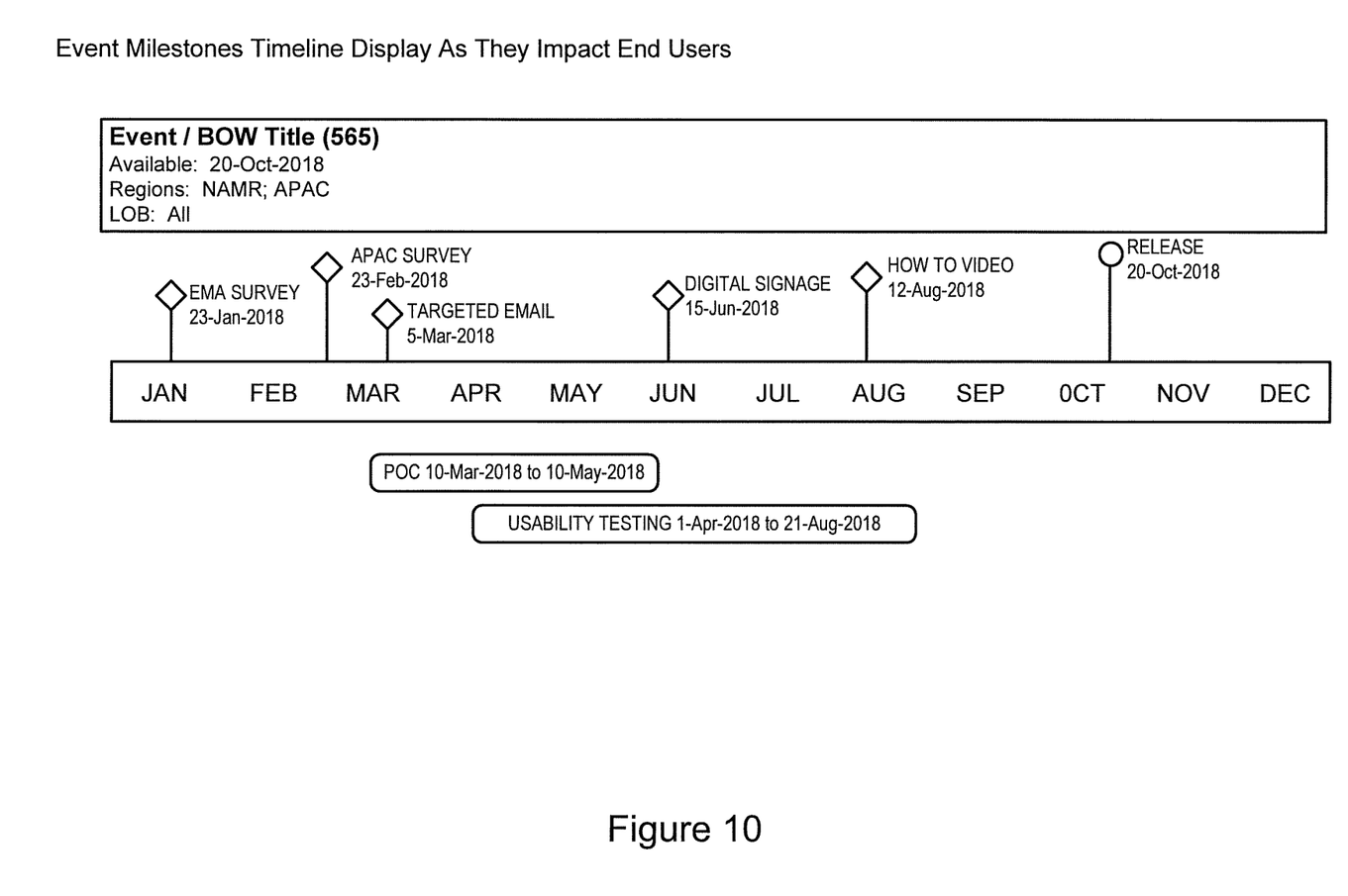
FIG. 10 is an exemplary illustration of an interactive roadmap portal, according to an embodiment of the present invention.

FIG. 10 is an exemplary illustration of an interactive roadmap portal, according to an embodiment of the present invention. As shown in FIG. 10, an event milestones timeline may display as the milestones impact end users. A series of events may be displayed throughout a predetermined time period. FIG. 10 illustrates a timeline in months. Other time periods may be applied, such as hours, days, weeks, months, years and/or other defined time period. Other variations may be applied.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that provides a dynamic interactive roadmap portal, the system comprising:
    a central data repository that stores and maintains event data captured at least in part by an Intake Tracker;
    an interactive user interface configured to:
        receive an input via a network communication;
        provide an option to subscribe to one or more specific events;
        provide links to one or more supplementary documents related to the one or more specific events;
        provide an option to share one or more specific events;
        provide administrative functions to an authorized user;
        provide a customizable display that, for a selected one of the one or more specific events, displays:
            milestones data,
            status information,
            one or more of region impacted,
            line of business impacted, and
            user impacts;
        export one or more selected views to a commonly used format, wherein the commonly used format is one of a spreadsheet, a table, and a PDF; and
    a processor, coupled to the central data repository and the user interface, configured to perform the steps comprising:
        receiving notification of a proposed event, the proposed event indicating at least one or more of proposed event name, source of proposed event request, proposed event type, proposed event schedule including proposed milestone dates, expected line of business impacted, and expected region impacted;
        transmitting, an input impacting disposition of the proposed event, the disposition being either a rejection of the proposed event or an approval of the proposed event;
        when the disposition of the proposed event is the rejection, displaying the rejection disposition and a plurality of disposition options for selection;
        when the disposition of the proposed event is the approval, displaying the approval disposition;
        receiving, via an electronic input, event data, wherein the event data includes one or more of event name, source of request, event type, line of business, funding status, and project status;
        automatically generating one or more tasks associated with the event data;
        generating, via a plurality of applications, an event icon that represents event status and event details, wherein the event status is displayed as a circular indicator that partially overlaps the event icon, and wherein the circular indicator changes its color or pattern based on the event status; and
        graphically displaying, via an Interactive Roadmap Portal, the event icon relative to a plurality of other events across a time period; the interactive user interface comprises a business collaboration section, a real-time communication section and a workspace services section, wherein the event icon, when clicked, displays a separate event details interface.

2. The system of claim 1, wherein the separate event details interface further provides a milestone interface.

3. The system of claim 1, wherein the Intake Tracker comprises an interactive forum to facilitate exchange of user inputs.

4. The system of claim 1, wherein the event icon and the plurality of other events are displayed according to region.

5. The system of claim 1, wherein the event icon and the plurality of other events are displayed according to line of business.

6. The system of claim 1, wherein the milestone interface further displays a region impacted section and a line of business impacted section.

7. The system of claim 1, wherein the milestone interface further provides an action interface that provides a set of actions comprising share, calendar, alert, contact and edit.

8. The system of claim 1, wherein the milestone interface displays a separate milestone detail interface that identifies activities that support a launch of the event.

9. The system of claim 1, wherein each event comprises a status icon.

10. The system of claim 1, wherein the business collaboration section comprises content services, mobile services and messaging services, wherein the real-time communication section comprises unified communications, multimedia services, trader voice and voice recording and call center services and wherein the workspace services section comprises application services, remote access, virtual workspace services, client workspace services, workspace tools and automation and branch transformation.

11. A method that provides a dynamic interactive roadmap portal, the method comprising the steps of:

storing event data captured at least in part by an Intake Tracker;

providing, via an interactive user interface, an option to subscribe to one or more specific events;

providing, via the interactive user interface, links to one or more supplementary documents related to the one or more specific events;

providing, via the interactive user interface, an option to share one or more specific events;

providing, via the interactive user interface, administrative functions to an authorized user;

providing, via the interactive user interface, a customizable display that, for a selected one of the one or more specific events, displays:
milestones data,
status information,
one or more of region impacted,
line of business impacted, and
user impacts;

exporting, through the interactive user interface, one or more selected views to a commonly used format, wherein the commonly used format is one of a spreadsheet, a table, and a PDF;

receiving notification of a proposed event, the proposed event indicating at least one or more of proposed event name, source of proposed event request, proposed event type, proposed event schedule including proposed milestone dates, expected line of business impacted, and expected region impacted;

transmitting, an input impacting disposition of the proposed event, the disposition being either a rejection of the proposed event or an approval of the proposed event;

when the disposition of the proposed event is the rejection, displaying the rejection disposition and a plurality of disposition options for selection;

when the disposition of the proposed event is the approval, displaying the approval disposition;

receiving, via an electronic input, event data, wherein the event data includes one or more of event name, source of request, event type, line of business, funding status, and project status;

automatically generating one or more tasks associated with the event data;

generating, via a plurality of applications, an event icon that represents event status and event details, wherein the event status is displayed as a circular indicator that partially overlaps the event icon, and wherein the circular indicator changes its color or pattern based on the event status; and graphically displaying, via an Interactive Roadmap Portal, the event icon relative to a plurality of other events across a time period; the interactive user interface comprises a business collaboration section, a real-time communication section and a workspace services section, wherein the event icon, when clicked, displays a separate event details interface.

12. The method of claim 11, wherein the event icon further provides a milestone interface.

13. The method of claim 11, wherein the Intake Tracker comprises an interactive forum to facilitate exchange of user inputs.

14. The method of claim 11, wherein the event icon and the plurality of other events are displayed according to region.

15. The method of claim 11, wherein the event con and the plurality of other events are displayed according to line of business.

16. The method of claim 11, wherein the milestone interface further displays a region impacted section and a line of business impacted section.

17. The method of claim 11, wherein the milestone interface further provides an action interface that provides a set of actions comprising share, calendar, alert, contact and edit.

18. The method of claim 11, wherein the milestone interface displays a separate milestone detail interface that identifies activities that support a launch of the event.

19. The method of claim 11, wherein each event comprises a status icon.

20. The method of claim 11, wherein the business collaboration section comprises content services, mobile services and messaging services, wherein the real-time communication section comprises unified communications, multimedia services, trader voice and voice recording and call center services and wherein the workspace services section comprises application services, remote access, virtual workspace services, client workspace services, workspace tools and automation and branch transformation.

* * * * *